United States Patent
Maeda

(10) Patent No.: US 7,213,067 B2
(45) Date of Patent: *May 1, 2007

(54) SYSTEM, APPARATUS AND CONTROL METHOD FOR MONITORING SYSTEM CHANGES WITHIN A NETWORK CONFIGURATION

(75) Inventor: Kenji Maeda, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/382,502

(22) Filed: Mar. 7, 2003

(65) Prior Publication Data

US 2003/0149760 A1 Aug. 7, 2003

Related U.S. Application Data

(62) Division of application No. 09/157,529, filed on Sep. 21, 1998, now Pat. No. 6,557,033.

(30) Foreign Application Priority Data

Sep. 29, 1997 (JP) .................................. 9-264601
Aug. 26, 1998 (JP) .................................. 10-240252

(51) Int. Cl.
  *G06F 15/173* (2006.01)
(52) U.S. Cl. ...................... 709/224; 709/220; 709/221; 709/223
(58) Field of Classification Search ................ 709/221, 709/222, 223, 224, 250; 710/10–16, 101, 710/104; 358/1.11–1.15
See application file for complete search history.

(56) References Cited

U.S. PATENT DOCUMENTS 5,580,177 A * 12/1996 Gase et al. .................... 400/61

(Continued)

FOREIGN PATENT DOCUMENTS

JP          8-195764         7/1996

(Continued)

OTHER PUBLICATIONS

Richard Nas, Universal sErial Bus Adds Plug and Paly Capability to External Computer Peripherals, Copyright May 1995.*

(Continued)

*Primary Examiner*—William Vaughn
*Assistant Examiner*—Joseph Maniwang
(74) *Attorney, Agent, or Firm*—Fitzpatrick, Cella, Harper & Scinto

(57) ABSTRACT

For making a host computer automatically recognize a composite apparatus used with switching between functions thereof, the host 102 recognized whether a device is connected, based on a potential of cable data1. With switching between the functions of the apparatus, the device 100 temporarily stops supply of power to the cable data1 and restart the supply a predetermined time thereafter by R controller 205. When the supply of power is stopped, the host 102 assumes that the device is disconnected and deletes a driver for the device from a memory. When the supply of power is restarted thereafter, the host 102 recognizes the device 100 as a device having a new function, reads device information, and installs a driver suitable for the new device.

12 Claims, 12 Drawing Sheets

U.S. PATENT DOCUMENTS

| | | | | |
|---|---|---|---|---|
| 5,671,282 | A | | 9/1997 | Wolff et al. .................... 380/25 |
| 5,689,730 | A | * | 11/1997 | Wakasugi .................... 710/56 |
| 5,699,489 | A | | 12/1997 | Yokomizo .................. 395/109 |
| 5,758,040 | A | * | 5/1998 | Ichimura et al. ........... 358/1.14 |
| 5,790,792 | A | | 8/1998 | Dudgeon et al. ...... 395/200.42 |
| 5,903,733 | A | | 5/1999 | Hong .................... 395/200.62 |
| 5,917,511 | A | | 6/1999 | Ueda ............................. 347/19 |
| 5,930,524 | A | * | 7/1999 | Sasaki .......................... 710/19 |
| 5,937,151 | A | * | 8/1999 | Kadota ...................... 358/1.15 |
| 6,009,527 | A | | 12/1999 | Traw et al. ................. 713/200 |
| 6,021,448 | A | * | 2/2000 | Kim ............................. 710/14 |
| 6,050,674 | A | | 4/2000 | Hirabayashi et al. ......... 347/40 |
| 6,058,445 | A | | 5/2000 | Chari et al. ................. 710/103 |
| 6,106,086 | A | | 8/2000 | Nishii ............................. 347/3 |
| 6,113,208 | A | | 9/2000 | Benjamin et al. ............... 347/7 |
| 6,122,073 | A | * | 9/2000 | Miyasaka et al. ........... 358/434 |
| 6,122,676 | A | | 9/2000 | Brief et al. ..................... 710/9 |
| 6,128,104 | A | * | 10/2000 | Okabe et al. ................ 358/442 |
| 6,141,680 | A | | 10/2000 | Cucchiara ................... 709/201 |
| 6,141,704 | A | | 10/2000 | Huang ......................... 710/15 |
| 6,142,600 | A | | 11/2000 | Takahashi et al. ............ 347/23 |
| 6,166,828 | A | | 12/2000 | Yamada et al. ............... 358/1.8 |
| 6,189,050 | B1 | | 2/2001 | Sakarda ........................ 710/18 |
| 6,226,096 | B1 | | 5/2001 | Ouchi ........................ 358/1.14 |
| 6,335,797 | B1 | * | 1/2002 | Hirosawa ................... 358/1.15 |
| 6,374,315 | B1 | | 4/2002 | Okada et al. ................. 710/62 |
| 6,557,033 | B2 | * | 4/2003 | Maeda ........................ 709/223 |
| 6,559,963 | B1 | * | 5/2003 | Kamimura ................. 358/1.15 |

FOREIGN PATENT DOCUMENTS

WO            94/27224       11/1994

OTHER PUBLICATIONS

22) Nass, "Universal Serial Bus Adds Plug-And Play Capability To External Computer Peripherals", 2328 Electronic Design, 43 (1995) May 1, No. 9, Cleveland, OH, US.

* cited by examiner

SYSTEM, APPARATUS AND CONTROL METHOD FOR MONITORING SYSTEM CHANGES WITHIN A NETWORK CONFIGURATION

This application is a division of application Ser. No. 09/157,529, filed Sep. 21, 1998 now U.S. Pat. No. 6,557,033.

BACKGROUND OF THE INVENTION

1. Field of the Invention

The present invention relates to a multi-functional composite apparatus, for example, connected to a network including computers, a control method thereof, and a network system therewith.

2. Related Background Art

An example of formation of the network using computers is the network of hierarchical star topology (connection configuration) as shown in FIG. 1. For forming the hierarchical star topology (connection configuration), each wire 101 is connected between host computer system 102 (hereinafter referred to as PC 102) and hub 103, between PC 102 and node 104, or between hub 103 and node 104. In this case, the PC 102 is provided for control of the network and the network includes only one PC. The hubs 103 having a repeater function of signal provide connection points of additional nodes 104 or hubs 103 and are thus indispensable components for establishing the network. Each node 104 is a computer I/O device, for example, such as a printer 106, a scanner 107, or a keyboard (not illustrated).

In order to realize the plug and play function (hereinafter abbreviated as PnP function) in which the host system recognizes a device connected on the above-stated network, finds a driver for control suitable for the device, and installs it at appropriate timing, there is a conventional method for reading information about the device (node 104) connected, in accordance with a protocol preliminarily determined. Specific examples of this information include a name of model, a name of manufacturer, power consumption, a maximum data rate, and so on.

For actualizing the PnP function by OS having limited program capacity, there is a method for moderately classifying the devices (into a printer class, an input class, a display class, an image class, a sound class, etc.), based on the information about the devices (nodes 104), and driving each device by a standard driver for its corresponding class. For example, the standards including IEEE1394 and USB are known as standards for the network to realize the PnP function stated above.

In recent years, the demand is increasing for composite apparatus having a plurality of functions (of different classes), e.g. a printer and a scanner. The method by the PnP function stated above is, however, not ready for composite equipment as a combination of devices of different classes, because it is adapted for reading the information only once upon recognition of device. Since the method is ready for only single-function devices, the following problems will be posed if the composite apparatus is connected through one network interface.

A plurality of drivers, each having a single function, are not allowed to be assigned to one network device. Namely, the PC does not allow a plurality of drivers to be installed for one network device.

Since the composite apparatus is off the standard concepts for the classes, the devices thereof are unable to be driven by the standard drivers.

This requires a special driver to be prepared for the devices. It is thus necessary to prepare one new driver by combining individual drivers used heretofore.

Since a plurality of mutually different drivers, e.g. drivers of different concepts such as the printer and the scanner, are combined into one, the resultant program must be larger than the drivers of single functions.

When one driver is adapted for two functions, e.g. the printer and the scanner, the system resources will be taken up more than necessary. Simply speaking, they are double those for the single-function devices. It is thus naturally concluded that this method fails to take full advantage of the features of the PnP.

SUMMARY OF THE INVENTION

The present invention has been accomplished in view of the conventional example described above and an object of the invention is to provide a composite apparatus with good operability that is automatically recognized according to its function available, a control method thereof, and a network system therewith.

Another object of the invention is to provide a composite apparatus that is conformed to the classification and that can also be driven by the standard drivers commensurate with the respective classes, without necessity for a special driver, a control method thereof, and a network system therewith.

Still another object of the invention is to provide a composite apparatus adapted so that with switching of a function of the composite apparatus to another function, a user is not required to perform a special operation for making the host computer recognize the switching, a control method thereof, and a network system therewith.

Still another object of the present invention is to provide a composite apparatus that can perform a function switching process of the composite apparatus without affecting other devices connected to the network, a control method thereof, and a network system therewith.

Still another object of the invention is to provide a composite apparatus adapted so that in response to a request for switching of function from the host computer to the composite apparatus, the composite apparatus makes the host computer recognize the switching of function, whereby the switching of function of the composite apparatus can be performed without modifying software or hardware on the host computer side, a control method thereof, and a network system therewith.

For accomplishing the above objects, a network system of the present invention is a network system comprising a host device and a composite apparatus capable of change in function, said composite apparatus being connected to said host device, wherein said composite apparatus comprises recognizing means for recognizing the change in function, and control means for performing such control as to make the host device recognize a function of the composite apparatus when the change in function is recognized by said recognizing means.

A composite apparatus of the present invention is a composite apparatus capable of change in function, said composite apparatus being connected to a host device, said composite apparatus comprising recognizing means for recognizing the change in function, and control means for performing such control as to make the host device recognize a function of the composite apparatus when the change in function is recognized by said recognizing means.

A control method of composite apparatus of the present invention is a control method of a composite apparatus capable of change in function, said composite apparatus being connected to a host device, said control method comprising:

a recognition step of recognizing the change in function; and a control step of performing such control as to make the host device recognize a function of the composite apparatus when the change in function is recognized by said recognition step.

A storage medium of the present invention is a storage medium for storing a control program of a composite apparatus capable of change in function, said composite apparatus being connected to a host device, said storage medium storing a program comprising:

a recognition step of recognizing the change in function; and a control step of performing such control as to make the host device recognize a function of the composite apparatus when the change in function is recognized by said recognition step.

DESCRIPTION OF THE PREFERRED EMBODIMENTS

Figure 12:
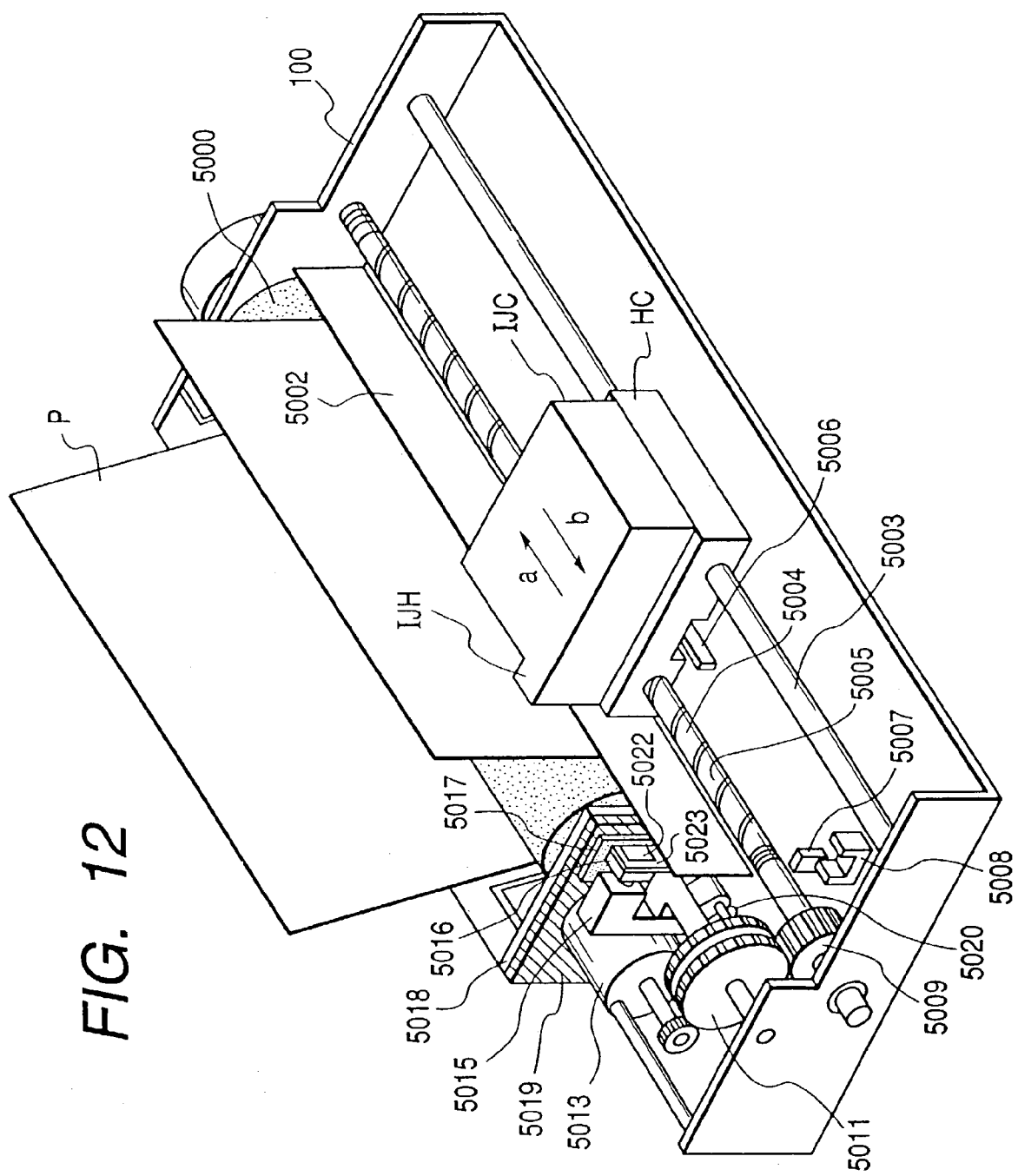
FIG. 12 is a perspective view of internal structure of a printer-scanner.

FIG. 12 is a perspective view to show the inside of printer-scanner composite apparatus 100 having a printer function and a scanner function that can be selectively used by replacing a head thereof with another head, as an embodiment of the present invention. This figure shows a configuration in which a printer head is mounted. In the same figure, lead screw 5005 is arranged to rotate through driving force transmission gears 5011, 5009 in conjunction with forward and backward rotation of driving motor 5013, and carriage HC has a pin (not illustrated) to be engaged with a spiral groove 5004 of the lead screw 5005, and is moved back and forth in directions of arrows a, b along guide 5003. For use as a printer, an ink jet cartridge IJC for ejecting droplets of ink is mounted on this carriage HC; for use as a scanner, a scanner head (not illustrated) having an optical sensor or the like for photoelectric conversion will be mounted on the carriage HC. Recording of image or scanning of original is carried out with translational movement of the carriage with either head thereon. A sheet press plate 5002 urges a print sheet or a read original against platen 5000 throughout the moving direction of the carriage HC. A photocoupler 5007, 5008 is provided for checking presence of a lever 5006 of the carriage in this area to detect the home position for changeover of rotating direction of motor 5013 and for other purposes. A support member 5016 supports a cap member 5022 for capping the front face of the printer head IJH when the apparatus is used as a printer. A suction part 5015 sucks the inside of this cap 5022 to effect suction recovery of the recording head through aperture 5023 in the cap. A cleaning blade 5017 is supported so as to be movable forward or backward through support member 5019, and these are supported by main support plate 5018.

Figure 2:
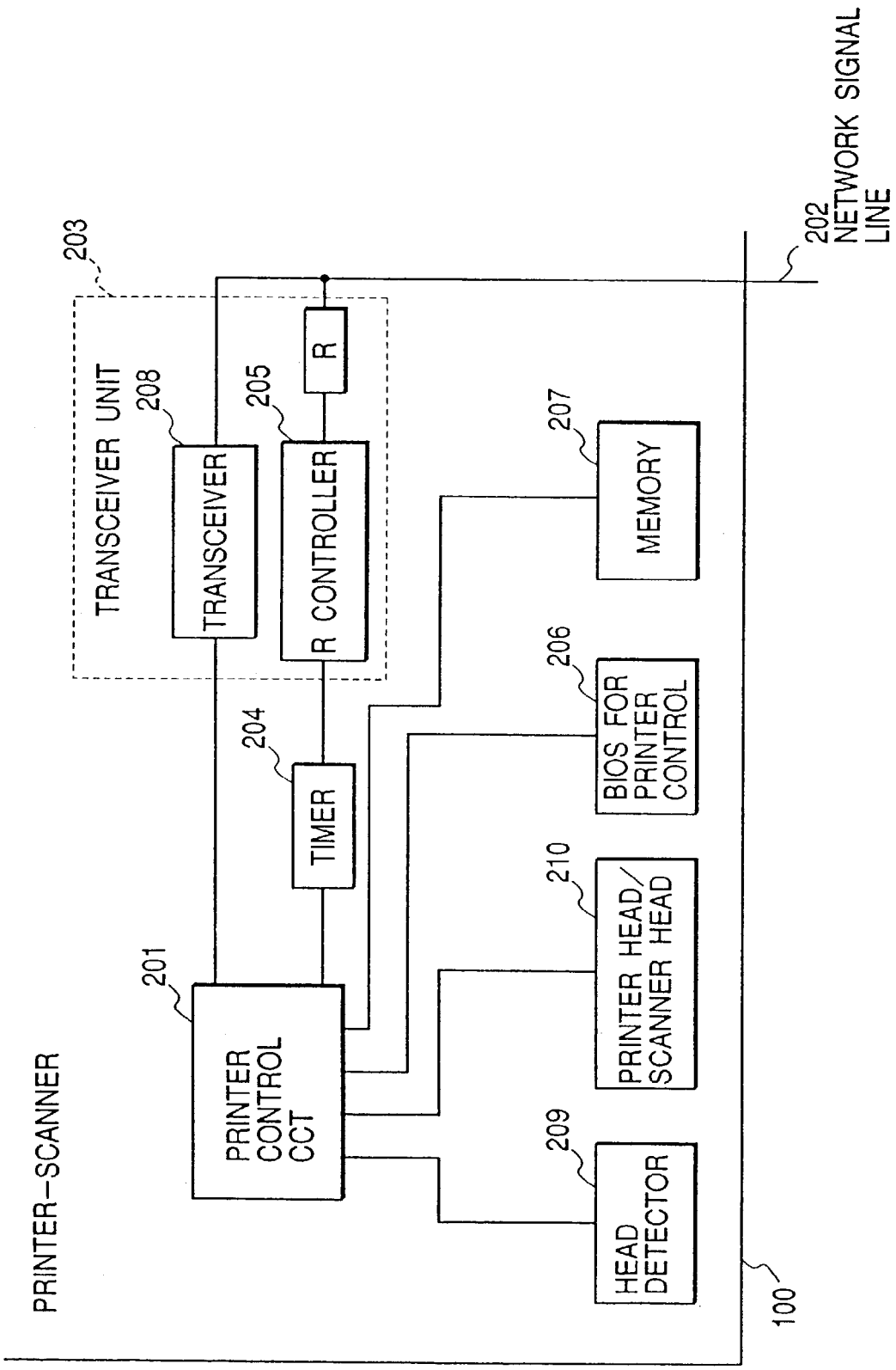
FIG. 2 is a block diagram of a network control system in a printer-scanner composite apparatus 100.

FIG. 2 is a block diagram to show a network control system of the printer-scanner composite apparatus 100 as an embodiment of the present invention.

The printer-scanner composite apparatus 100 has a printer control circuit 201 for performing main control of the printer, a printer head for printing or a scanner head for reading of image, 210, a head detector 209 for detecting the type of head, a basic input/output system (BIOS) 206 for control of printer stored in ROM or the like, as a control program for execution of the main control of printer, a transceiver unit 203 as a network interface for connection to the host computer or to a hub, and a timer 204 for control of the transceiver unit 203. The transceiver unit 203 includes a transceiver 208 as a principal part thereof, an R controller 205 detailed hereinafter, and a resistor R.

The printer control circuit 201 executes control of printing or control of reading of scanner data, according to control from network signal line 202 through the transceiver unit 203. The printer control circuit 201 controls the R controller 205, mainly composed of FETs (not illustrated), in the transceiver unit 203 by controlling the timer 204, so as to control the resistor R connected thereto.

The BIOS 206 for printer control includes control programs, print fonts (CG), and other fixed data and implements control procedures for carrying out the control of motor, the driving controls of the printer head and the scanner head, and so on. The printer control circuit 201 receives a print command, data, or a scanner command from the signal line 202 or outputs the scanner data under according to the printer control BIOS 206. Memory 207 is a memory having a work area used as a register, and such areas as a line buffer for storing print data for one line, a dot development buffer for storing data re-developed into dots, and a transmission/reception buffer for data from the network.

The head detector 209 is arranged to detect the head 210 mounted on the carriage. The head 210 records an image on a print sheet or scans an original under control of the printer control circuit 201. The head 210 performs printing when the print head for printer is mounted, whereas the head 210 performs reading of data when the scanner head is mounted.

The timer 204 has a counter and performs control to keep the R controller 205 off for a fixed time after receiving a pulse signal from the printer control circuit 201.

When the head is replaced by the other, more specifically, when the printer head is replaced by the scanner head, the printer control circuit 201 sends a pulse to the timer 204. Receiving the pulse, the timer 204 performs the control to keep the R controller 205 off for the fixed time. Further, the printer control circuit 201 sends the information including the model name of the scanner, the name of manufacturer thereof, its power consumption, its maximum data rate, etc. stored in the printer control BIOS 206, based on the detection result of the head detector 209, in response to a request from the network.

When the scanner head is replaced by the printer head on the other hand, similar operation is carried out to send the information including the model name of the printer, the name of manufacturer thereof, its power consumption, its maximum data rate, etc. stored in the printer control BIOS 206 in response to a request for reading of information from the network.

Figure 3:
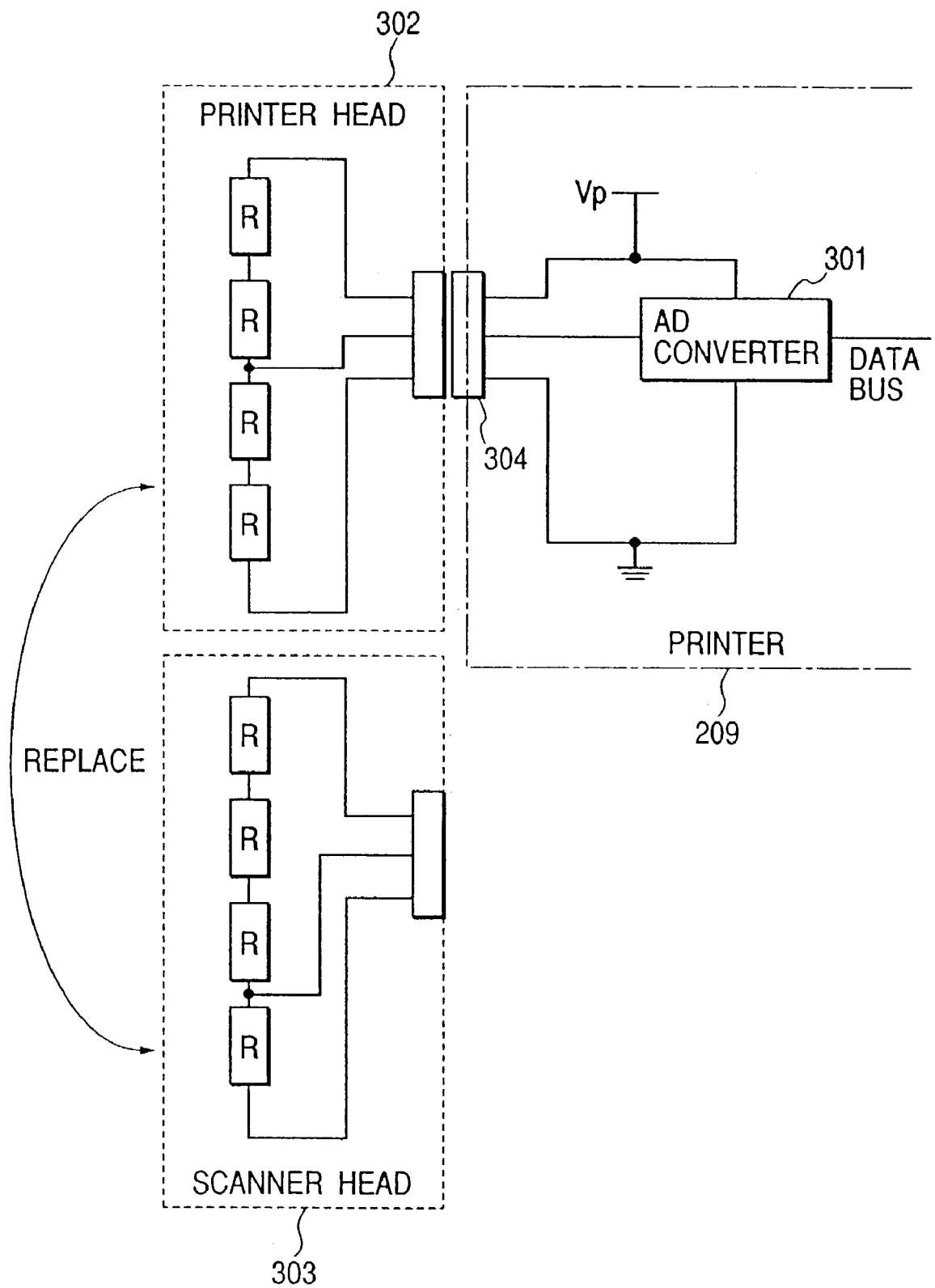
FIG. 3 is a block diagram of head detector 209 and heads.

FIG. 3 is a structural diagram of the head detector 209 and detection circuits in the heads.

The head detector 209 is mainly comprised of AD converter 301. Each of the printer head 302 (specifically, an ink jet head of the cartridge type) and the scanner head 303 (specifically, a CCD cartridge) includes resistors for identification. Further, each head receives supply of power Vp and a divided voltage signal of the resistors for identification through connector 304.

Based on the above configuration, the AD converter 301 converts the divided voltage signal according to a ratio of division of the resistors inside the head to digital data. This ratio of division is intrinsic to each type of head and the divided voltage is also determined according to this ratio. Therefore, the printer control circuit 201 can determine the type of the head mounted on the head mounting portion or carriage by reading the divided voltage data. In FIG. 3, the ratio of division of the printer head 302 is 1:1, while that of the scanner head 303 is 3:1. An output value from the AD converter is thus also determined according to this ratio and thus allows discrimination of the type of head.

Figure 4:
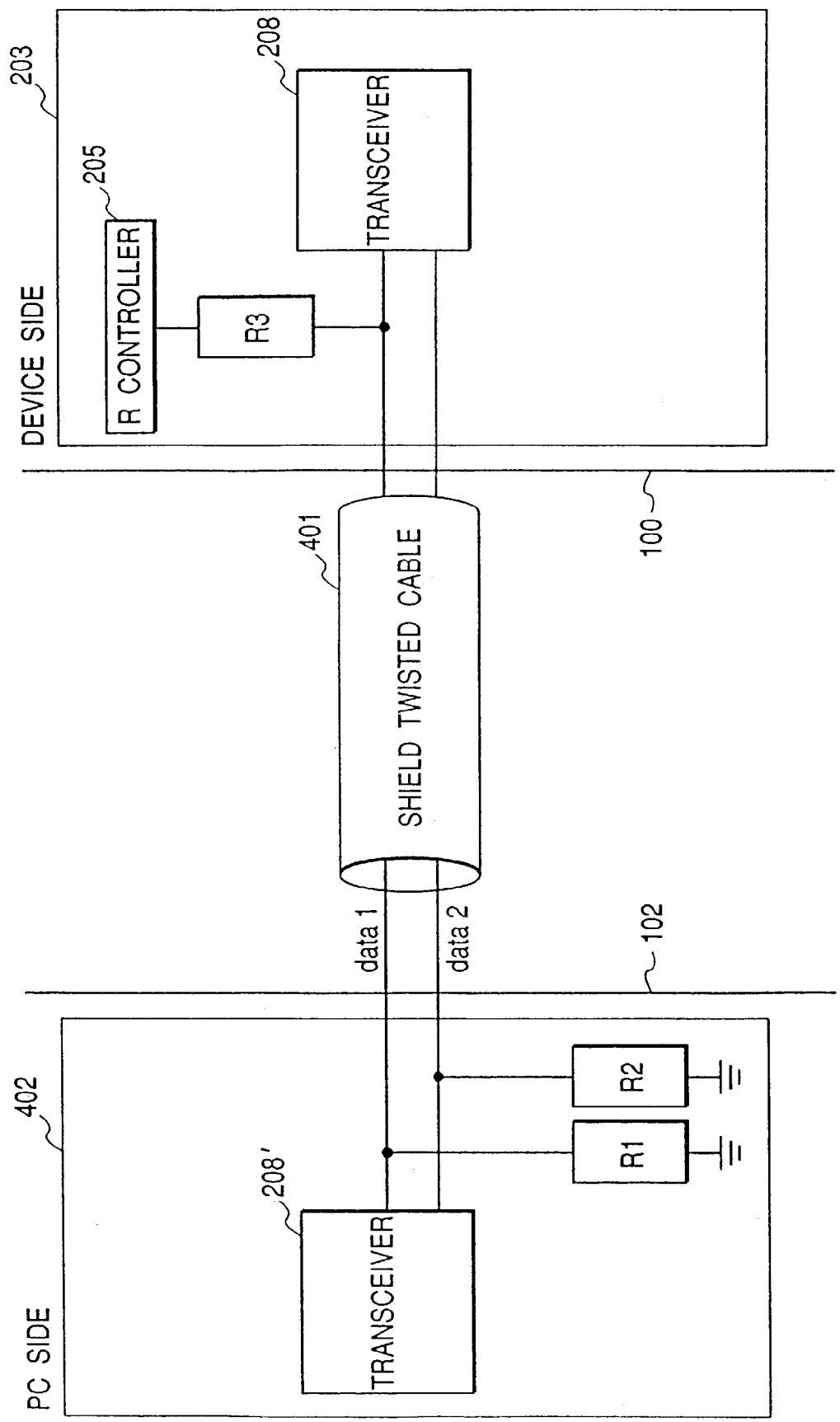
FIG. 4 is a diagram to show signal lines forming the network and a driver thereof.

FIG. 4 is a diagram to show signal lines for forming the network and a driver thereof in the present embodiment.

A shield twisted cable 401 (hereinafter referred to as cable 401) comprised of signal lines data1 and data2 connects a transceiver unit 402 of PC 102 to a transceiver unit 203 of apparatus 100. Each signal line connects transceiver 208 to 208' (similar to the transceiver 208) to achieve exchange of data on an electrical basis. Each of resistors R1, R2 is connected to an associated signal line to prevent the signal lines from having high impedance. FIG. 4 illustrates an example in which the PC is directly connected to the device, but the same can also be applied to the case where the hub 103 discussed previously is interposed between them.

The hub 103 composed of plural downstream ports and an upstream port has a function to repeat data to the ports and a function to transfer change in a signal connected to a downstream port (connection or disconnection) to the upstream.

Each transceiver 208, 208' incorporates a differential amplification type input/output device, ports for reading of voltages of the respective signal lines, a serial-parallel converter, and so on, and controls electric signals of the signal lines data1, data2. Each signal line data1, data2 can serially transmit a control signal of PC 402 and a signal from another node according to a protocol preliminarily determined.

Described below are states of signals serially transmitted according to the USB:
 one bit time unit is 82 ns;
 J state (idle state) is defined by a state of data1 high and data2 low;
 K state is defined by a state of data1 low and data2 high;
 a disconnected state is defined by a condition in which a state of data1 low and data2 low is detected for 2.5 us or more;

a packet end is defined by a condition in which the state of data1 low and data2 low is continued for 26 bit time units and the J state of one bit time unit is detected thereafter;
 transfer from the idle state to the K state indicates packet start;
 a lapse of time not less than 16 bit time units from the packet end indicates time-out.

Figure 1:
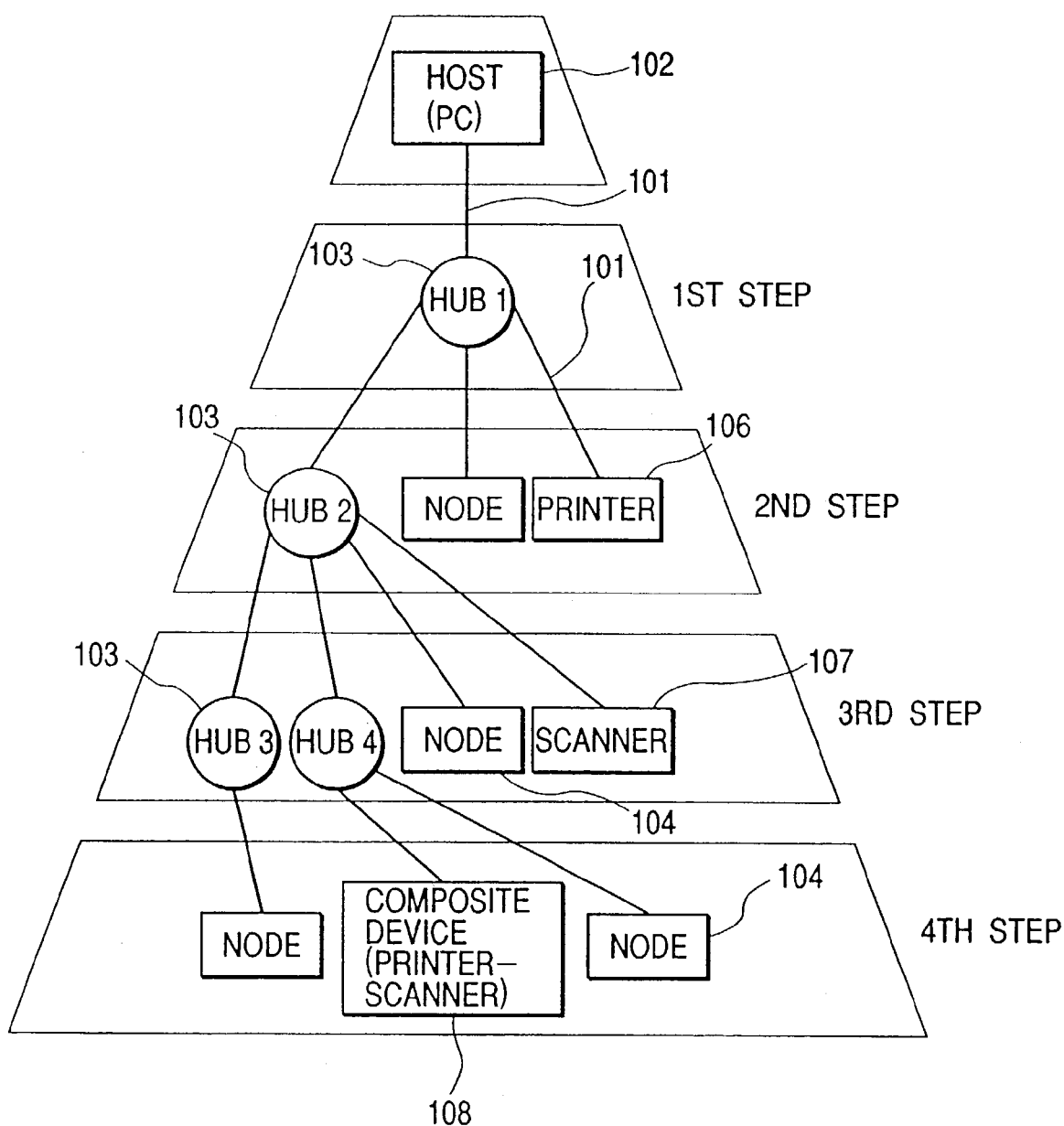
FIG. 1 is a diagram to show a hierarchical star network.

In the present embodiment, a clock signal for synchronization between devices and an address for specifying a device are added to the header at the time of packet start. Therefore, the network having the topology as illustrated in FIG. 1 can also compose the star network around the center of PC 102 on a logical basis. Serial data is indicated by the J (logical high) or K (logical low) state of one bit time unit. A packet is always generated from the PC 102, and a device designated receives the data, according to a command in the packet. Further exchange of data is carried on between them.

When the signals of data1 and data2 are inspected on the PC 402 side, the state of data1 high and data2 low indicates connection of the device at a terminal on the node side of the network. The disconnected state is determined when the state of no exchange of signal, which is the state of data1 low and data2 low, is detected for 2.5 us or more.

In the transceiver unit 203 on the device side, data1 is connected through resistor R3 to the R controller 205. The R controller 205 connected to the resistor R3 is controlled according to the detection result of the head detector 209 mainly comprised of FETs, and can establish a pseudo state of disconnection of the device 100.

Figure 5A:
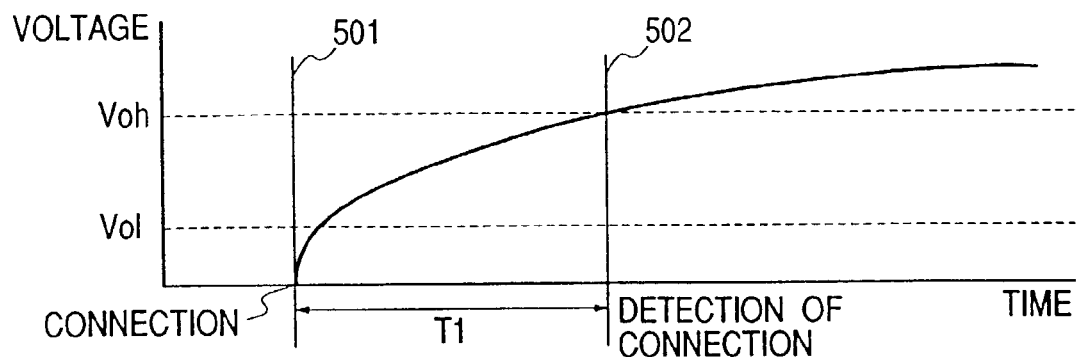
FIGS. 5A, 5B and 5C are diagrams to show connection timing and disconnection timing of cable 401 and voltage changes in the signal line.
Figure 5B:
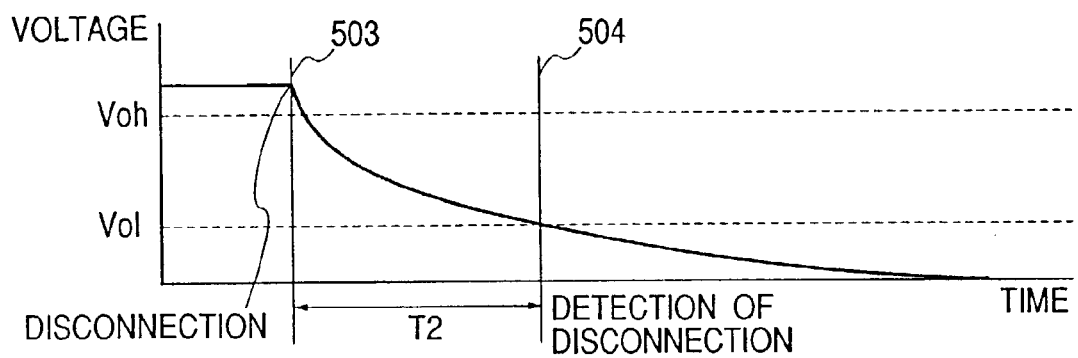
Figure 5C:
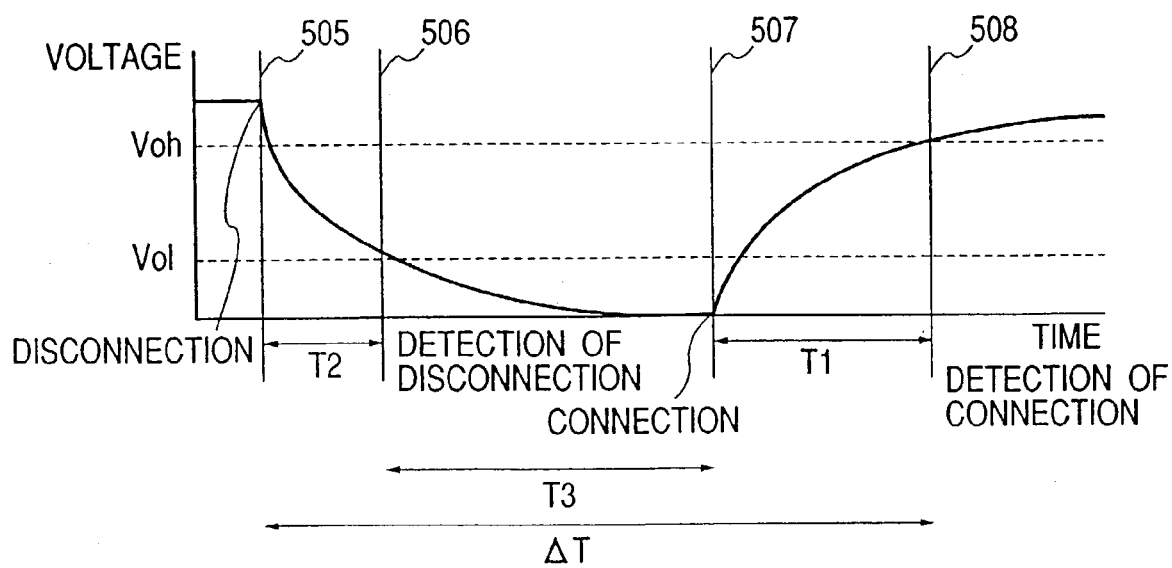

FIGS. 5A to 5C show connection timing and disconnection timing of the device 100 and voltage changes of data1.

The port of the transceiver 208 connected to data2 is in a non-active state and is thus kept in the low state by the resistor R2.

Vol and Voh used in FIGS. 5A to 5C indicate detectable voltages of "low" and "high", respectively, of the port connected to data1 of the PC 102.

FIG. 5A is a diagram to show a normal connection sequence of device.

Timing 501 is timing when the device is connected to the network. At this time the R controller 205 connected to the resistor R3 outputs 5 V, and the voltage of data1 increases depending upon the resistance R3 and the capacitance of the cable 401. After a lapse of a certain time T1 (or timing 502), the potential of data1 exceeds Voh, so as to permit the port input to be recognized as a high level. Consequently, the PC 102 can find that the device is connected to the downstream port. The PC 102 can specify the device newly added to the cable 401 according to the predetermined protocol and place a driver commensurate with the device in the memory accordingly.

Further, FIG. 5B is a diagram to show a normal disconnection sequence of device.

Timing 503 is timing when the device 100 is detached from the network. The voltage of data1 decreases depending upon the resistance R1 and the wire capacitance of data1. After a lapse of a certain time T2 (or timing 504), the potential of data1 becomes lower than Vol, so as to permit the port input to be recognized as a low level. Consequently, the PC 102 can find that the device is disconnected, after a lapse of 2.5 us. The detachment of the cable 401 and device 100 permits the PC 102 to eliminate the driver etc. for the disconnected device 100 and to rearrange the inside of the system.

FIG. 5C shows a voltage waveform upon pseudo operation of disconnection and connection of the device from and to the network under control of the R controller 205 characteristic of the present embodiment.

At timing 505 the power supply to the resistor R3 is stopped under control of the R controller 205. This demonstrates the same waveform as when the cable 401 is pulled out. The stop of the power supply causes the voltage of data1 to gradually decrease depending upon the resistance R1 and the capacitance of the cable. After a lapse of a certain time T2 (or timing 506), the potential of data1 becomes smaller than Vol, so as to permit the port input to be recognized as a low level.

Further, the R controller 205 again starts the power supply to the resistor R3 after a lapse of a predetermined time T3 (>2.5 us). Consequently, the PC 102 recognizes the device as if to be disconnected, just as the device of the cable 401 of the downstream port is physically detached. The time T3 is determined as a time in which the PC 102 can delete the driver for the device (the printer driver or the scanner driver) and rearrange the inside of the system. When the power supply is restarted to the resistor R3, the waveform is the same as where the device is attached to the cable 401, and the voltage of data1 increases depending upon the resistance R3 and the capacitance of the cable. After a lapse of a certain time T1 (or timing 508), the potential of data1 exceeds Voh, so as to permit the port input to be recognized as a high level. Consequently, the PC 102 can find that the device is connected to the downstream port. Then the PC 102 can read the information from the device and install an appropriate driver (the scanner driver or the printer driver) based thereon.

Figure 6:
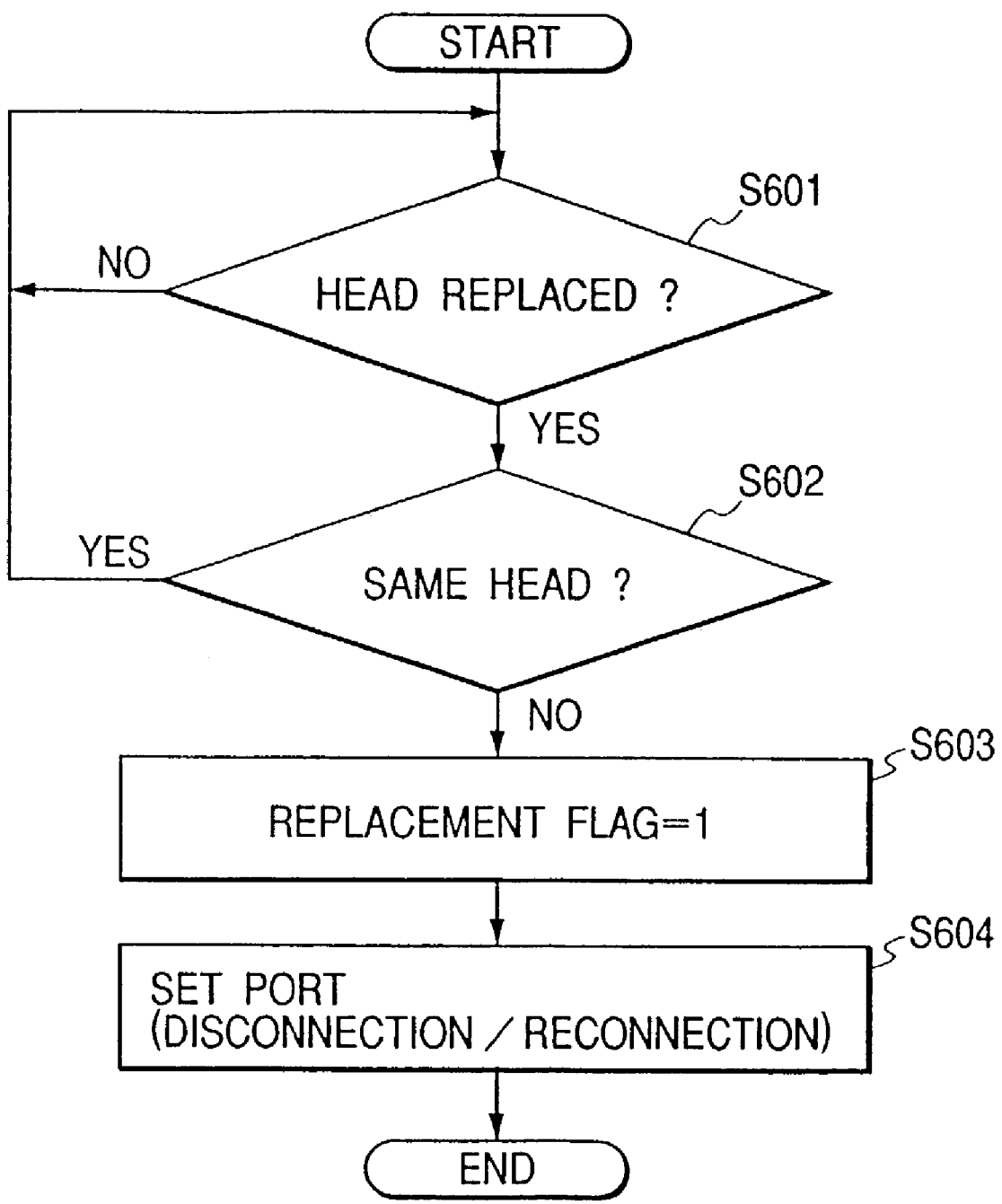
FIG. 6 is a control flowchart upon replacement of head in the printer-scanner-composite apparatus.

FIG. 6 is a control flowchart executed upon replacement of head in the printer-scanner composite apparatus of the present invention. This program is carried out by the printer control circuit 201.

Step 601 is to determine whether the user replaced the head with another, by reading the head detector 209. When there is a replacement operation performed, step 602 is to determine whether the newly mounted head is of the same type as the head which was mounted immediately before the replacement operation. When the head is determined to be of the same type as before, the flow returns to step 601. When the head is of a new type on the other hand, the flow proceeds to step 603.

Step 603 is to set a replacement flag to indicate replacement of head with another head of a different type and then the flow goes to step 604. Step 604 is to apply a pulse signal for reconnection of port to the timer 204, and then the processing is terminated.

When the timer 204 is started by the pulse signal, the timer 204 controls the R controller 205 to stop the power supply to the resistor R3. After counting the time T2+T3 shown in FIG. 5C, the timer restarts the power supply. As a consequence, the PC 102 recognizes as if the device disconnection and connection operations are carried out with an interval of the time T3+T1, though the cable is kept in connection on the network. The processes of disconnection and connection of the device 100 are executed in this way.

With detachment of the device 100, the PC 102 uninstalls the driver for the device 100 from the PC 102. Subsequently, the PC 102 recognizes as if the device 100 is newly connected on the network. Therefore, the PC 102 sends a reset signal to the new device 100 and starts the processing including the process of reading the information according to the predetermined protocol.

Figure 7:
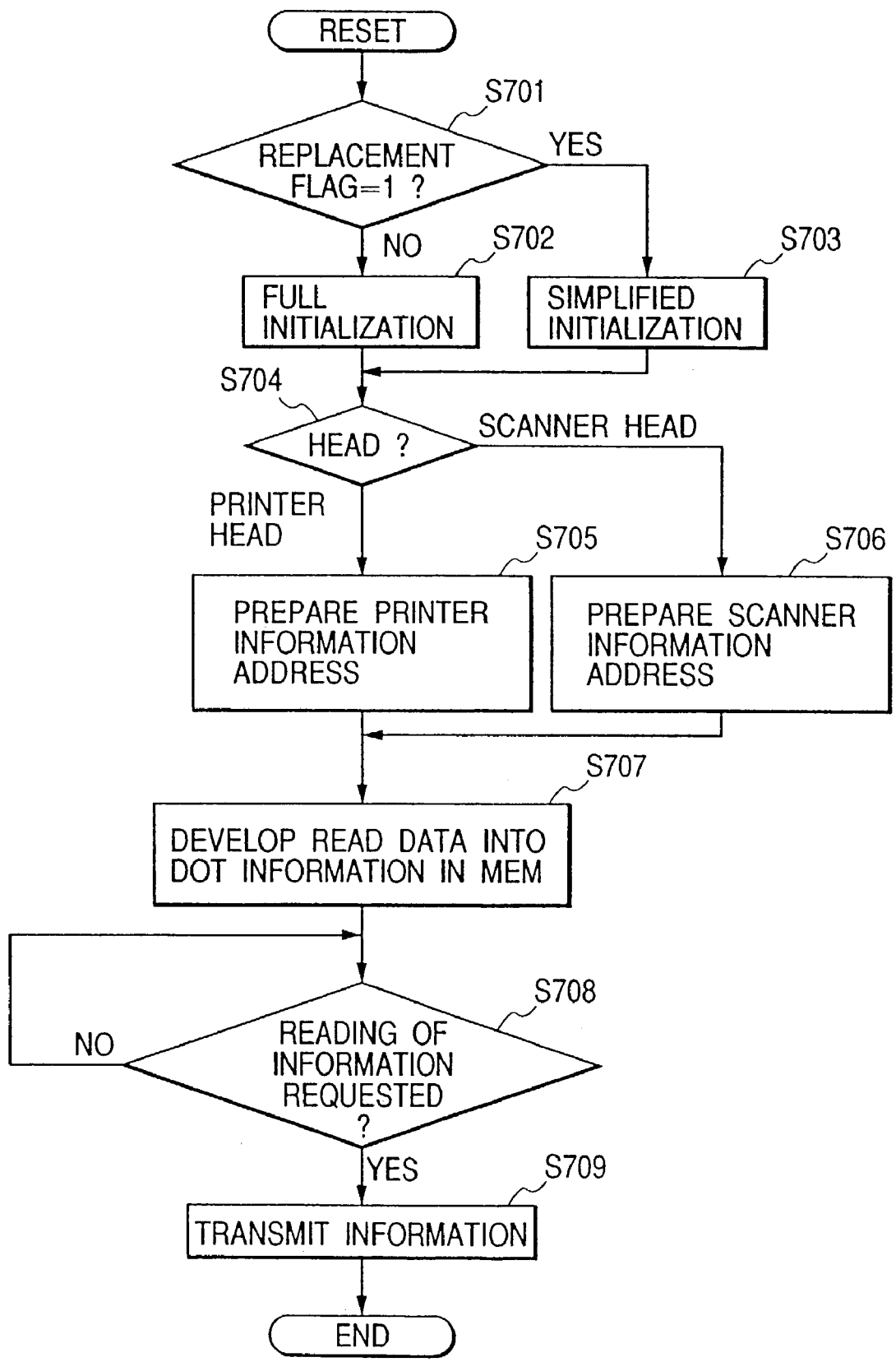
FIG. 7 is a control flowchart upon reset in the printer-scanner composite apparatus.

FIG. 7 is a control flow when the reset signal from the PC is received. This process is started when the device 100 receives the reset command issued by the PC 102 on the occasion of disconnection/connection of the network in step 604 of FIG. 6.

First, step 701 is carried out to test the determination flag to determine if the reset is due to power-on of device or due to replacement of head. In the case of replacement of head, the replacement flag is set to 1 in step 603. Therefore, the flow goes to step 702 when the replacement flag=0, i.e., when the reset is determined to be power-on reset; whereas the flow goes to step 703 when the replacement flag=1, i.e., when the reset is one due to replacement of head.

Step 702 is to carry out the initialization operation of the memory, the printer mechanism, etc., and step 703 is to carry out the initialization operation of only the printer mechanism, because the memory has been initialized before. At this time the replacement flag is reset to 0.

Next, step 704 is to read the digital signal from the head detector 209 to determine the status of head. Depending upon the status, step 705 or step 706 is carried out with the printer head or with the scanner, head, respectively. When reading of the head detector 209 results in determining that the head is the scanner head 303, the device prepares a leading address of the printer control BIOS 206 in which the information prepared for the scanner is stored as shown in Table 1. When the head is determined to be the printer head 302, the device prepares the address in which the information prepared for the printer (see Table 1) is stored.

Step 707 is to read data of a determined length from the printer control BIOS 206 according to the address prepared previously, to preliminarily develop the data into dot information in the memory 207, and to prepare for response to a request for reading of information from the PC 102. When in step 708 the device receives a request for reading of the device information from the PC 102, step 709 is carried out to transmit the expanded information in the memory 207 through the transceiver unit 203 to the PC 102 and then the processing is terminated.

In this way the information is correctly transmitted to the PC 102 in accordance with the status of head, thereby transmitting the information capable of implementing the PnP at appropriate timing.

Table 1 below is an example of the device information sent from the scanner-printer composite apparatus as the device 100 of the present embodiment to the PC as the host computer.

TABLE 1 example of device information

|  | Printer | Scanner |
| --- | --- | --- |
| Name of manufacturer | Canoe | Canoe |
| Product ID | 01h | 02h |
| Class | printer | image |
| Transfer size | 8 bytes | 32 bytes |

When the printer head is mounted, "name of manufacture (Canoe)", "product ID (01h)", "class (printer)", and "transfer size (8 bytes)" are sent to the PC. When the scanner head is mounted, "name of manufacture (Canoe)", "product ID (02h)", "class (image)", and "transfer size (32 bytes)" are sent to the PC.

Figure 8:
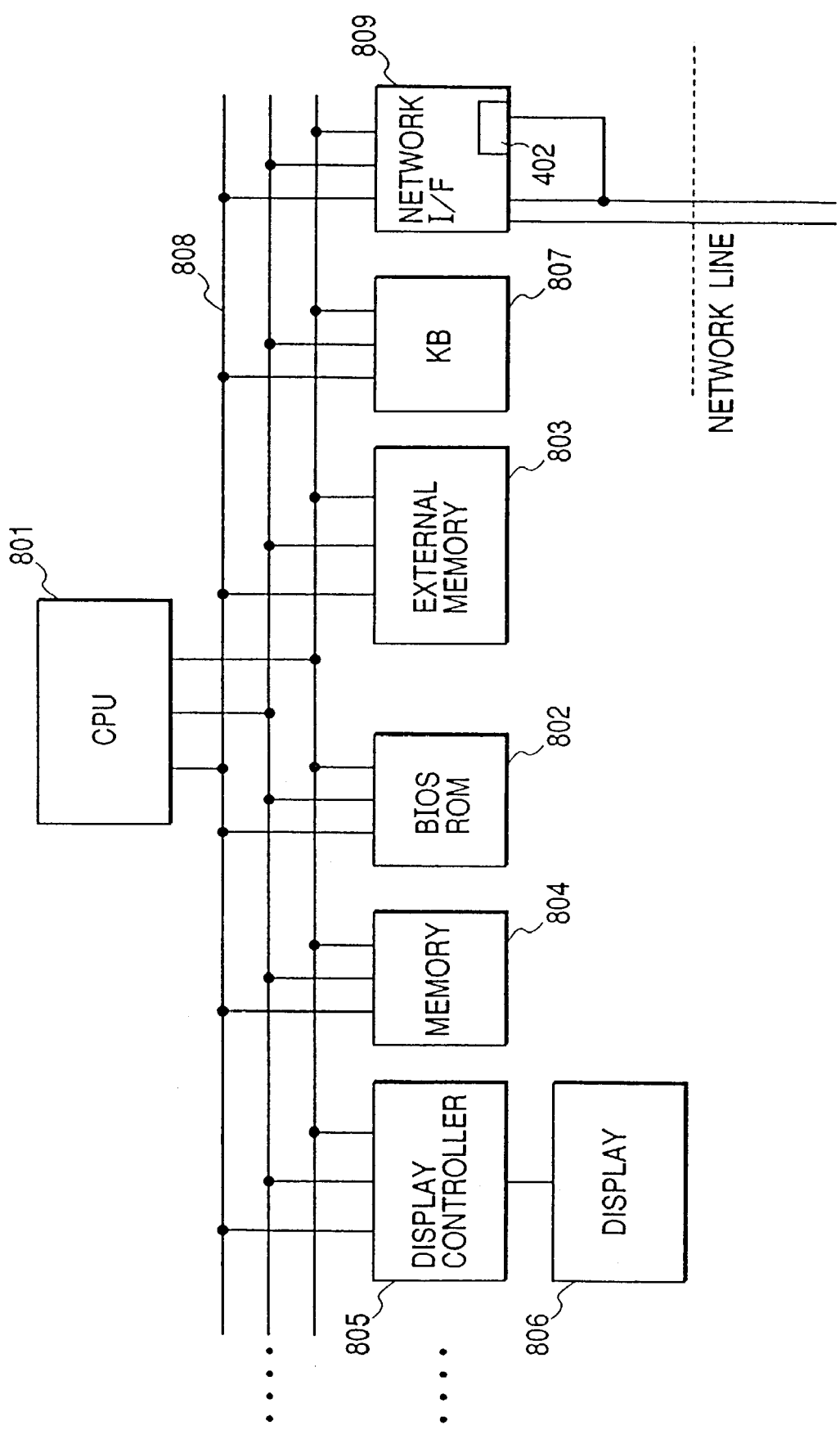
FIG. 8 is a schematic block diagram of PC 102.

FIG. 8 is a schematic block diagram of the PC 102.

In the PC 102, a central processing unit (CPU) 801 for performing the main control is connected through various paths 808 (data path, address bus-control path) to various blocks.

The PC 102 has the CPU 801 to perform the main control thereof and a read only memory (BIOSROM) 802 for storing basic control programs thereof. An application program is read out of external memory 803 (specifically, a floppy disk, a hard disk, or the like) and the program is executed by use of system memory 804. A displaying method on a screen at this time is to display characters etc. on a display 806 (specifically, a liquid crystal display or a CRT) by use of display controller 805 and permit key input through keyboard (KB) 807. Network I/F 809 performs input/output control of signal to and from the network line and includes the transceiver unit 402 stated previously.

Figure 9:
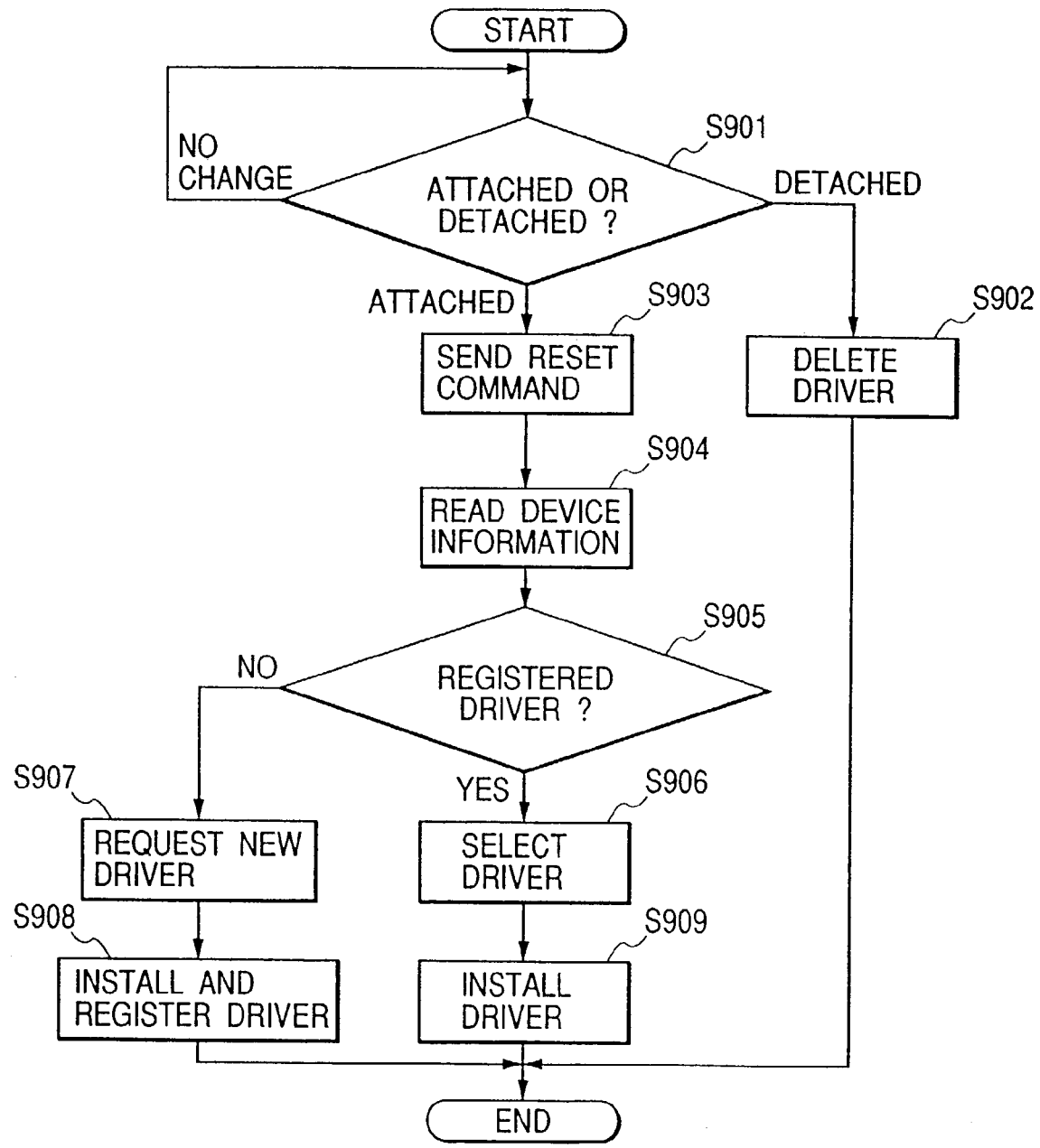
FIG. 9 is a flowchart concerning recognition of device on the network by PC 102.

FIG. 9 is a flowchart of the operation concerning the network, of the PC 102.

The CPU 801 always monitors change in signal of the network I/F 809 and determines whether a new device is attached onto or detached from the network in step 901. This determination is made for each device in such a way that the device is determined to be disconnected if the potential of the cable thereof during no communication is not more than Vol or that the device is determined to be connected if the potential is not less than Voh, as discussed with FIGS. 5A to 5C. When a new device is determined to be connected (or attached), the flow proceeds to step 903; when the device is disconnected (or detached), the flow proceeds to step 902. Step 902 is to clear the driver for the dismounted device, which has been expanded in the memory heretofore, to free the space occupied thereby for use of other software, and to terminate the process.

Step 903 is to send a reset signal for initialization to the new device connected and move to step 904. The device, receiving the reset signal, performs the processing according to the procedures in FIG. 7 to send the device information in response to the request from the PC.

Step 904 is to send the request for the device information to the new device connected and to read the data. Step 905 is to inspect the device information thus read, particularly the manufacturer, class, transfer size, etc. and to determine if the driver has already been registered or if the driver is loaded in the external memory 803. If registered then the flow goes to step 906; if not registered then the flow goes to step 907.

Step 907 is to give the user an indication that a new driver for the device needs to be installed, and then the flow moves to step 908. Step 908 is to install the driver, which is obtained from a removable memory such as the FD or through communication, in the external memory 803 typified by the memory and the HDD, set the driver in a registered state, and then go to the end.

On the other hand, step 906 is to select the data stored and registered in the external memory 803 typified by the HDD by reference to the device information read in step 904; step 909 is to develop the driver into dot information in the memory; and then the processing is terminated.

Now, let us explain the operation where the hub 103 is interposed between the PC 102 and the device 100.

The hub 103 performs the detection operation similar to the port detection operation of the PC 102 discussed previously. When detecting change is signal (connection or disconnection) at a downstream port, the hub 103 converts it to data indicating the state change and the state of the hub to enable the PC 102 to read the data after the conversion. The PC 102 reads the state change of each hub 103 connected, at regular intervals (every 10 ms). On the other hand, only the hub 103 with the state change sends the data indicating the state change to the PC 102. When the PC 102 detects the state change by reading the data indicating the state change of the hub 103, the PC 102 can recognize the state of connection or disconnection by reading the converted data indicating the state from the hub 103 with the change accordingly. Detecting the disconnection state of the device, the PC 102 executes step 902 stated previously. Detecting the connection state on the other hand, the PC 102 controls the hub so as to send the reset signal for initialization to the device connected and executes the steps in and after step 904. Therefore, no problem will arise even with the hub 103 present in the network.

The information indicating the change in signal (connection or disconnection) flows from the device 100 toward the upstream (PC 102). Further, setting (information) according to the connection information is directed from the PC 102 to the device. Therefore, the change of state can be realized without affecting the other device(s) connected to the network than the upstream device(s) midway to the PC 102.

As described above, the printer-scanner composite apparatus of the present embodiment is constructed in such a configuration that with replacement of head from the printer head to the scanner head or from the scanner head to the printer head, the type of the head is determined and the voltage of the signal line connected to the host computer is stopped for the fixed time according to the type and again supplied, thereby permitting the host to recognize the execution of disconnection and connection of device. This configuration permits the device to output in response to the request from the PC the various information of the device (the model name, ID, class, etc.) necessary for the PnP or necessary for the host computer to perform the automatic recognition of the device according to the type of the head on the occasion of connection of signal line.

In the composite apparatus thus constructed, each device is recognized according to the function used, no special driver needs to be prepared for the composite apparatus, and even the standard drivers commensurate with the respective classes can also be used.

In addition, the two functions can be selectively used with the signal lines for one device.

Since only switching of head causes the host computer to recognizes it, the user does not have to perform any special operation for the host computer, which realizes good operability.

In an example of a system where the scanner device is connected to the printer device so as to be used as a copying machine, the apparatus can be arranged so that the host computer is made to recognize change of the apparatus by detecting the change from the state of the printer alone to the state of connection of the scanner to the printer (or the reverse change) and changing the voltage of the signal line as stated previously and the driver of the host computer is switched based thereon.

In the case where the printer is equipped with such options as a double-side print unit, a sorter unit, and a staple unit, the apparatus can also be arranged to make the host computer recognize the change in state of the apparatus by changing the voltage of the signal line as discussed previously. When the program or the like of the apparatus is subject to version up, the apparatus can also be arranged to make the host computer recognize the change in state of the apparatus by changing the voltage of the signal line as described previously.

The present embodiment was described as to the star network, but it can also be actualized in other networks including the peer to peer network. The present embodiment was described as the apparatus with the scanner and printer, but there are no specific restrictions on the types of devices loaded. In a further modification the composite apparatus can also be implemented with three or more devices. The means for detecting connection and disconnection of device was described as the means using the voltage of the network signal, but it can also be implemented by other means, specifically, detection by a communication disable state, detection by watch dog timer, etc. and a variety of other methods can also be contemplated.

Further, the present embodiment is arranged to recognize the type of the head after replacement and perform the automatic recognition of the device based thereon, but the invention is not limited to this configuration as long as the information is one to indicate switching between the functions of the composite apparatus. For example, it can be switching on a switch manipulated by the user. In this case, a signal intrinsic to each function is detected and switching of function is recognized based thereon.

[Second Embodiment]

The second embodiment has substantially the same structure as the first embodiment, but the second embodiment is provided with three types of heads, including a high-definition print head newly added. The high-definition print head includes resistors as described previously and the position of division thereof is different from those of the other heads. Therefore, the head detector 209 can read data different from those of the two other heads and the printer control circuit 201 can detect the type of each head.

Figure 10:
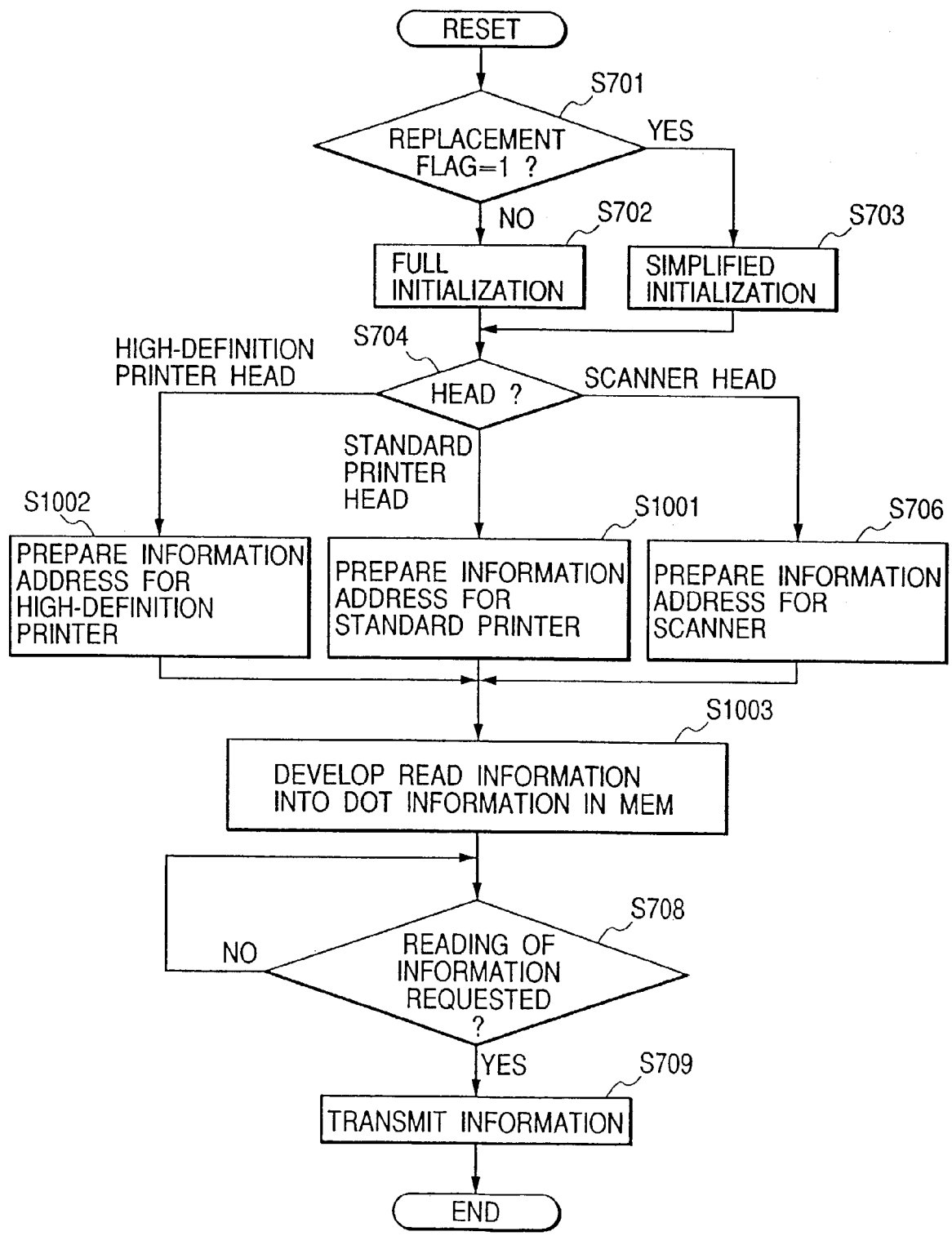
FIG. 10 is a control flowchart upon reset to show the second embodiment.

FIG. 10 is a control flowchart upon reset to show the second embodiment.

When the device 100 is disconnected from or connected to the network in step 604 of FIG. 6, the PC 102 issues the reset command in step 903 of FIG. 9. Receiving the reset command, the printer determines in step 701 whether the reset is the power-on reset or the reset by replacement of head. With determination of the power-on reset, the flow proceeds to step 702; with determination of the reset by replacement of head, the flow proceeds to step 703. It is noted that steps having the same procedures as in FIG. 7 are denoted by the same reference numerals.

Step 702 is to perform the initialization operation of the memory, the printer mechanism, etc., while step 703 is to perform the process of simply carrying out the initialization operation of only the printer mechanism, because the memory has been initialized before. Which head is mounted is then determined in step 704 and information according to either type is prepared in step 1001, 1002, or 706. Specifically, when reading of the head detector 209 results in determining that the head is for scanner, the flow goes to step 706 to prepare the address of the device information for the scanner. This information is stored in the printer control BIOS 206. With determination of the standard print head, the flow goes to step 1001 to prepare the address of the device information for the standard print printer, as in step 706. With determination of the high-definition print head, the flow goes to step 1002 to prepare the address of the device information for the high-definition print printer, as in step 706.

Step 1003 is to read the device information in the printer control BIOS 206 using the address of the device information set above, to preliminarily develop it into dot information in the memory 207, and to prepare for response to the request from the PC 102. When the request for reading is received in step 708, the flow goes to step 709 to send the information developed in the memory 207 to the transceiver 203 and then the processing is terminated. Accordingly, correct information according to the state of head is transmitted to the PC 102 to transmit the information to realize the PnP at appropriate timing.

Since the PC 102 recognizes that a device was disconnected and then a new device was connected to the network, as described above, it can also install a different driver for another type of head (a head of a different print method), as well as the driver for the different device such as the scanner.

Further, the model name and ID were mainly used as kinds of information transmitted to the PC 102, but information of other kinds can also be subject to change similarly. Specifically, it is also possible to change the processing of the PC 102 using the power consumption information, the communication rate information on the network, and the information including the transfer data size, the size of information amount, and so on. There are thus no specific restrictions on the kinds of information sent through the network.

[Third Embodiment]

Figure 11:
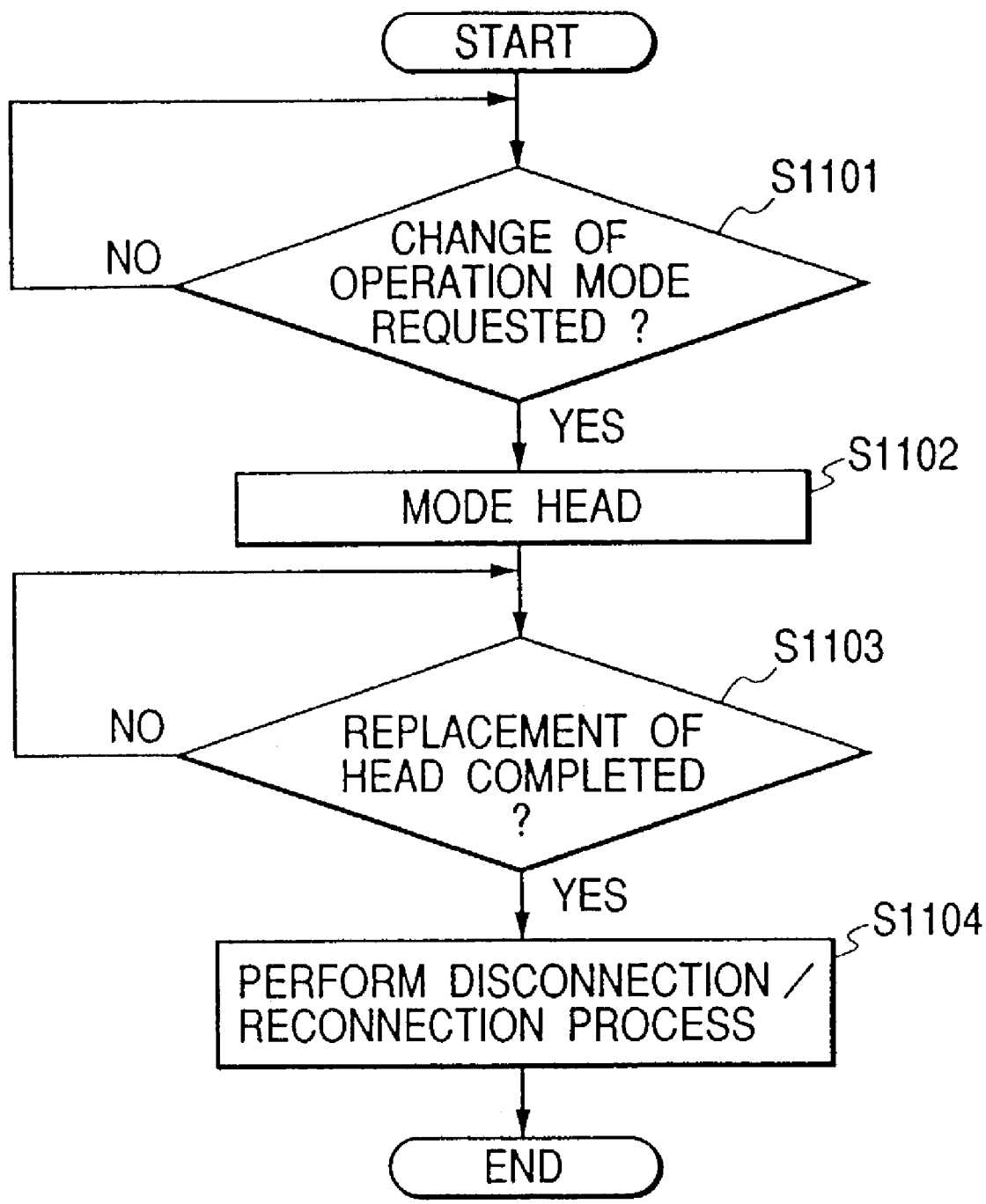
FIG. 11 is a control flowchart upon replacement of head in the printer-scanner composite apparatus to show the third embodiment.

FIG. 11 is a control flowchart upon replacement of head in the printer-scanner composite apparatus to show the third embodiment.

When a head replacement process is started by the application working on the PC 102, it is determined in step 1101 whether the PC 102 issued a request for replacement of head. When the request is received, step 1102 is carried out to move the head of the printer to a predetermined position for replacement of head. Step 1103 is to wait until the user has performed operation for completion of head replacement. Step 1104 is a step executed when a new type of head is recognized. In step 1104, the replacement flag to indicate the replacement of head is set, the port is set/reset, a pulse signal is applied to the timer 204, an instruction for control of disconnection and reconnection of the device is supplied to the timer 204, and the process is completed.

Once the timer 204 is started by the pulse signal, the timer 204 stops the power supply to the resistor R3 for the predetermined time T2+T3 and thereafter restarts the supply. Accordingly, the PC 102 executes the process of disconnection and connection of the network once while the cable is kept in connection on the network.

The PC 102 uninstalls the driver, having been installed in the PC 102, according to the disconnection of the network. Since the PC 102 assumes that a new device is connected onto the network, it sends the reset signal to the new device and carries on the processing according to the predetermined protocol.

Therefore, the request for disconnection of device can be started from the PC 102, and the new device connected to the network can be recognized after replacement of head, disconnection, and reconnection. This permits the remote control of the request for switching between the functions of the composite apparatus and the device recognition operation in response thereto to be performed through the network from the PC 102.

[Fourth Embodiment]

The preceding embodiments described above were adapted to generate the pulse from the printer control circuit 201 with replacement of head or the like and to make the timer 204, receiving the pulse, perform the control to keep the R controller 205 off for the fixed time, but another method to achieve the same effect can also be implemented so as to reset the printer control device itself once and to control the power supply to the resistor R3 by use of a series of the initialization sequence of the printer control BIOS 206.

(Other Embodiments)

The objects of the present invention can also be accomplished by an embodiment wherein a system or an apparatus is provided with a storage medium for storing program code of software to implement the functions of the embodiments described above and wherein a computer (or CPU or MPU) of the system or the apparatus reads the program code stored in the storage medium to execute the program.

In this case, the program code itself read out of the storage medium implements the functions of the embodiments described above and the storage medium storing the program code constitutes the present invention.

Examples of the storage medium for supplying the program code include a floppy disk, a hard disk, an optical disk, a magnetooptical disk, a CD-ROM, a CD-R, magnetic tape, a nonvolatile memory card, an ROM, and so on.

The present invention involves not only the embodiments wherein the functions of the embodiments described previously are implemented by executing the program code read by the computer, but also those wherein, based on instructions of the program code, the OS (operating system) working on the computer executes part or the whole of the actual processing to implement the functions of the embodiments described above by the processing.

Further, the invention also involves an embodiment wherein the program code read out of the storage medium is written into a memory provided in a function extended board put in the computer or in a function extended unit connected to the computer and thereafter, based on instructions of the program code, the CPU or the like provided in the function extended board or in the function extended unit executes part or the whole of the actual processing to implement the functions of the embodiments described above by the processing.

As detailed above, the composite apparatus, the control method thereof, and the network system therewith according to the present invention are adapted to permit the host computer to recognize the composite apparatus as either device according to the function thereof used.

Therefore, the composite apparatus is arranged to permit the automatic recognition of the now available function, thus achieving good operability.

The composite apparatus of the invention well suits the classification without need for a special driver and can be driven even by the standard drivers commensurate with the respective classes.

On the occasion of switching between the functions of the composite apparatus, the user does not have to perform a special operation for making the host computer recognize it.

The switching operation between the functions of the composite apparatus can be carried out without affecting the other devices connected to the network.

In response to the request for switching between functions from the host computer to the composite apparatus, the composite apparatus makes the host computer recognize the switching between functions, so that the switching between functions of the composite apparatus can be carried out without changing the software or the hardware on the host computer side.

What is claimed is:

1. An information processing apparatus connected to a device via a network, comprising:
    a discrimination unit adapted to discriminate whether the device is connected to the network or disconnected from the network;
    an installation unit adapted to, if said discrimination unit discriminates that the device is connected to the network, transmit to the device an instruction that instructs the device to send device information of the device to said information processing apparatus and to install a device driver for the device based on the device information received from the device; and
    a deletion unit adapted to delete a device driver for the device if said discrimination unit discriminates that the device is disconnected from the network.

2. An apparatus according to claim 1, wherein said installation unit determines based on the received device information whether the device driver for the device has been registered, and installs the device driver if it is determined that the device driver for the device has been registered, and requests the device driver if it is determined that the device driver for the device has not been registered.

3. An apparatus according to claim 1, wherein said discrimination unit discriminates that the the device is connected to the network if a network signal changes from a low potential status to a high potential status, and discriminates that the device is disconnected from the network if the network signal changes from a high potential status to a low potential status.

4. An apparatus according to claim 1, wherein said deletion unit deletes the device driver for the device such that a memory space used for the device driver is released for use by other software.

5. An information processing method for an information processing apparatus connected to a device via a network, comprising:
    a discrimination step of discriminating whether the device is connected to the network or disconnected from the network;
    an installation step of, if said discrimination step discriminates that the device is connected to the network, transmitting to the device an instruction that instructs the device to send device information of the device to said information processing apparatus and installing a device driver for the device based on the device information received from the device; and
    a deletion step of deleting a device driver for the device if said discrimination step discriminates that the device is disconnected from the network.

6. A method according to claim 5, wherein said installation step determines based on the received device information whether the device driver for the device has been registered, and installs the device driver if it is determined that the device driver for the device has been registered, and requests the device driver if it is determined that the device driver for the device has not been registered.

7. A method according to claim 5, wherein said discrimination step discriminates tat the device is connected to the network if a network signal changes from a low potential status to a high potential status, and discriminates that the device is disconnected from the network if the network signal changes from a high potential status to a low potential status.

8. A method according to claim 5, wherein said deletion step deletes the device driver for the device such that a memory space used for the device driver is released for use by other software.

9. An computer readable program stored on a computer readable memory medium, the program for executing an information processing method for an information processing apparatus connected to a device via a network comprising:

a discrimination step of discriminating whether the device is connected to the network or disconnected from the network;

an installation step of, if said discrimination step discriminates that the device is connected to the network, transmitting to the device an instruction that instructs the device to send device information of the device to said information processing apparatus and installing a device driver for the device based on the device information received from the device; and a deletion step of deleting a device driver for the device if said discrimination step discriminates that the device is disconnected from the network.

10. A computer readable program according to claim 9, wherein said installation step determines based on the received device information whether the device driver for the device has been registered, and installs the device driver if it is determined that the device driver for the device has been registered, and requests the device driver if it is determined that the device driver forte device has not been registered.

11. A computer readable program according to claim 9, wherein said discrimination step discriminates that the device is connected to the network if a network signal changes from a low potential status to a high potential status, and discriminates tat the device is disconnected from the network if the network signal changes from a high potential status to a low potential status.

12. A computer readable program according to claim 9, wherein said deletion step deletes the device driver for the device such that a memory space used for the device driver is released for use by other software.

* * * * *

UNITED STATES PATENT AND TRADEMARK OFFICE
CERTIFICATE OF CORRECTION

PATENT NO.         : 7,213,067 B2
APPLICATION NO. : 10/382502
DATED                 : May 1, 2007
INVENTOR(S)        : Maeda It is certified that error appears in the above-identified patent and that said Letters Patent is hereby corrected as shown below:

<u>Title page, under item (56) References Cited</u>
OTHER PUBLICATIONS, "Richard Nas, Universal sErial Bus Adds Plug and Paly Capability to External Computer Peripherals" should read --Richard Nass, "Universal Serial Bus Adds Plug and Play Capability to External Computer Peripherals"--.

<u>COLUMN 4</u>:
Line 46, "under" should be deleted.

<u>COLUMN 5</u>:
Line 62, "data 1" should read -- data1 --; and
Line 66, "us" should read -- µs --.

<u>COLUMN 6</u>:
Line 23, "us" should read -- µs --; and
Line 61, "us" should read -- µs --.

<u>COLUMN 7</u>:
Line 14, "(>2.5 us)." should read -- (>2.5 µs). --.

<u>COLUMN 8</u>:
Line 57, "manufacture" should read -- manufacturer --; and
Line 60, "manufacture" should read -- manufacturer --.

<u>COLUMN 10</u>:
Line 41, "recognizes" should read -- recognize --.

<u>COLUMN 14</u>:
Line 52, "tat" should read -- that --.

UNITED STATES PATENT AND TRADEMARK OFFICE
CERTIFICATE OF CORRECTION

PATENT NO. : 7,213,067 B2
APPLICATION NO. : 10/382502
DATED : May 1, 2007
INVENTOR(S) : Maeda It is certified that error appears in the above-identified patent and that said Letters Patent is hereby corrected as shown below:

COLUMN 16:
Line 3, "forte" should read -- for the --; and
Line 9, "tat" should read -- that --.

Signed and Sealed this

Tenth Day of June, 2008

JON W. DUDAS
*Director of the United States Patent and Trademark Office*